United States Patent [19]

Kitagawa et al.

[11] Patent Number: 5,118,160
[45] Date of Patent: Jun. 2, 1992

[54] CAR BODY MEMBER WITH BEADS

[75] Inventors: Yuichi Kitagawa, Yukosuka; Masaaki Tsuda, Kamakura, both of Japan

[73] Assignee: Nissan Motor Co., Ltd., Yokohama, Japan

[21] Appl. No.: 573,804

[22] Filed: Aug. 29, 1990

[30] Foreign Application Priority Data

Aug. 30, 1989 [JP] Japan .................. 1-221688

[51] Int. Cl.⁵ .............................................. B62D 25/00
[52] U.S. Cl. ................................................... 296/189
[58] Field of Search .............................. 296/188, 189

[56] References Cited

U.S. PATENT DOCUMENTS

| | | | |
|---|---|---|---|
| 3,831,997 | 8/1974 | Myers | 296/189 |
| 3,883,166 | 5/1975 | Cadiou | 296/189 X |
| 4,684,151 | 8/1987 | Drewek | 296/189 X |
| 4,702,515 | 10/1987 | Kato et al. | 296/189 |

FOREIGN PATENT DOCUMENTS

| | | | |
|---|---|---|---|
| 266084 | 5/1988 | European Pat. Off. | 296/189 |
| 116268 | 7/1983 | Japan | 296/189 |

OTHER PUBLICATIONS

Yamaguchi et al., "Efficient Energy Absorption Of Automobile Side Rails", Technical Session No. 3 (Occupant Protection For Frontal Impact) pp. 321-326, Feb. 1986.

*Primary Examiner*—Margaret A. Focarino
*Assistant Examiner*—Joseph D. Pape
*Attorney, Agent, or Firm*—Foley & Lardner

[57] ABSTRACT

A member for a car body in which concave and convex beads can be positioned appropriately regardless of a complexity of a shape of the member, and the efficiency of energy absorption can be improved. The member includes side faces having concave beads provided on the side faces at positions corresponding to dip portions of a buckling waveform produced by an initial buckling load applied to the member in a state of having no bead; convex beads provided on the side faces at positions corresponding to peak portions of the buckling waveform; and flat portions without any bead, formed between each adjacent concave bead and convex bead. The side faces may also have edge beads provided on edges of the side faces at positions corresponding to a dip portion of the buckling waveform which is closest to a front end to be subjected to a crushing load.

16 Claims, 12 Drawing Sheets

FIG. 6

| BEAD TYPE | PROMOTING DEFORMATION | PEAK LOAD REDUCTION RATE | REMARK |
|---|---|---|---|
| CONCAVE SIDE FACE BEAD | CONCAVE DEFORMATION | APPROXIMATELY 14 % | EFFECTIVE IN PROMOTING CRUSHING |
| CONVEX SIDE FACE BEAD | CONVEX DEFORMATION | APPROXIMATELY 14 % | EFFECTIVE IN PROMOTING CRUSHING |
| EDGE BEAD | CONCAVE DEFORMATION | APPROXIMATELY 16 % | EFFECTIVE IN INDUCING CRUSHING |

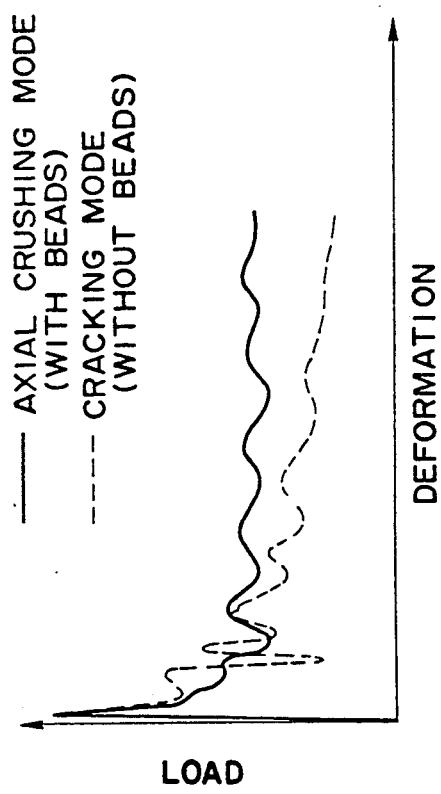

FIG. 7

—— AXIAL CRUSHING MODE (WITH BEADS)
--- CRACKING MODE (WITHOUT BEADS)

2.5 msec 5.0 msec 7.5 msec 10.0 msec

CRACKING

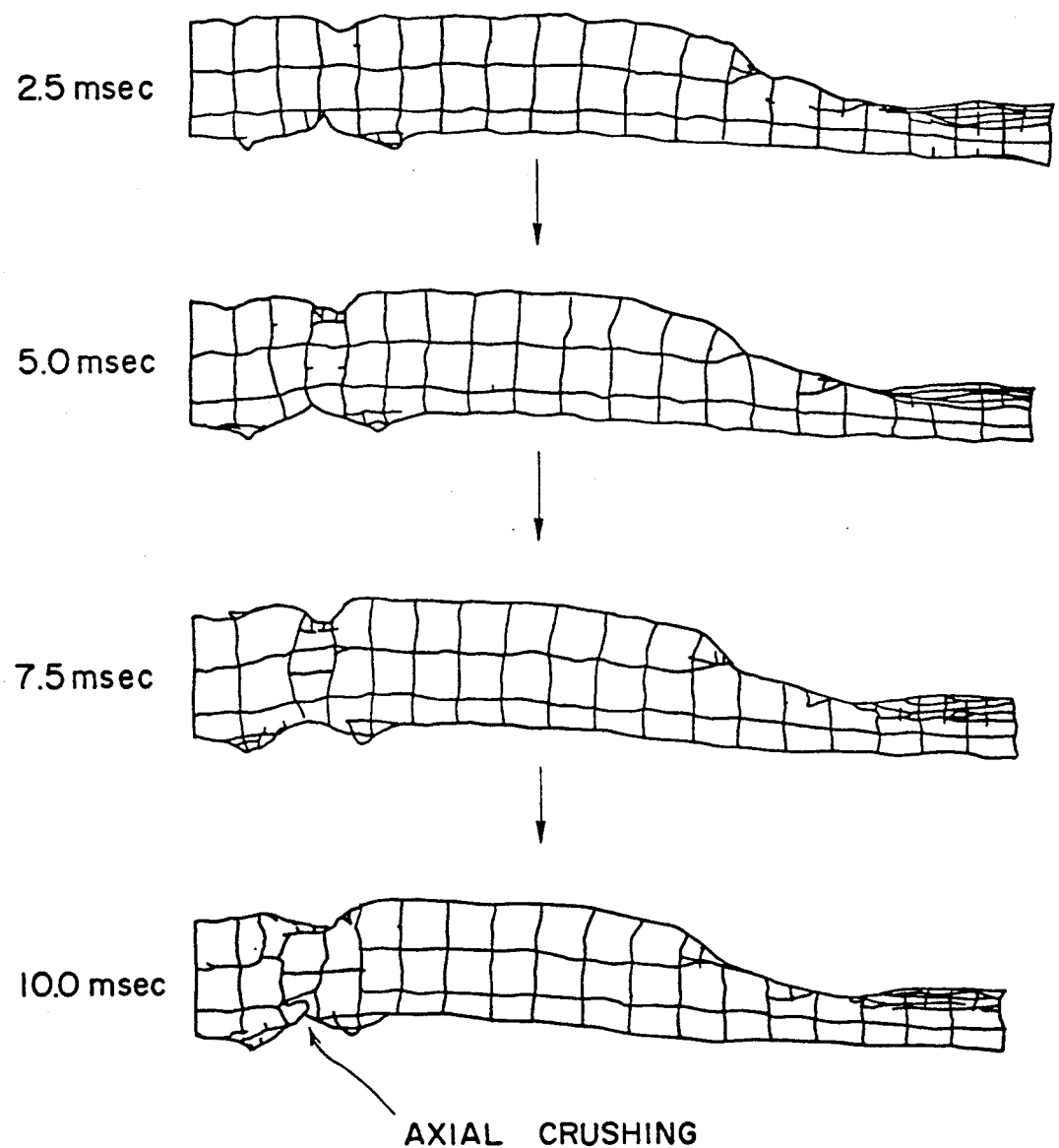

FIG. 10(A)
FIG. 10(B)
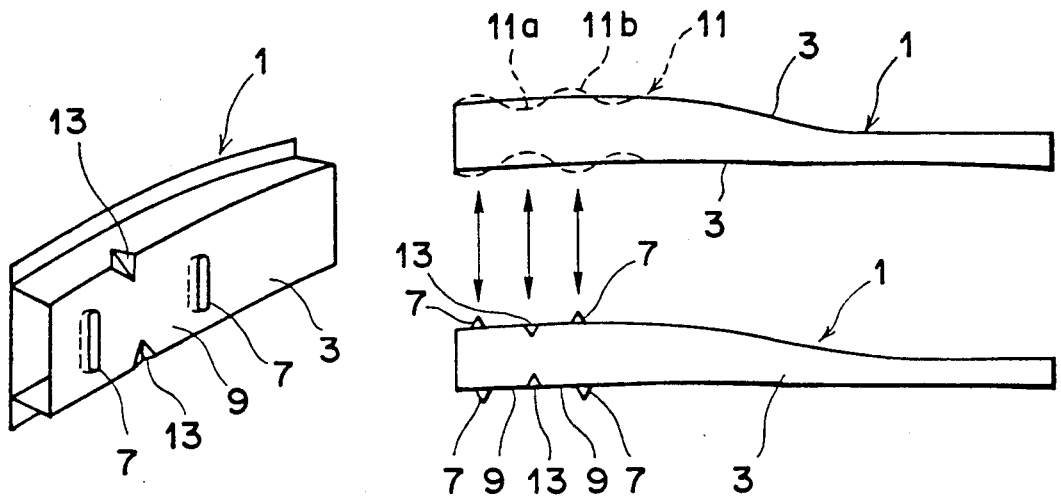
FIG. 11
— AXIAL CRUSHING MODE (WITH BEADS)
--- CRACKING MODE (WITHOUT BEADS)
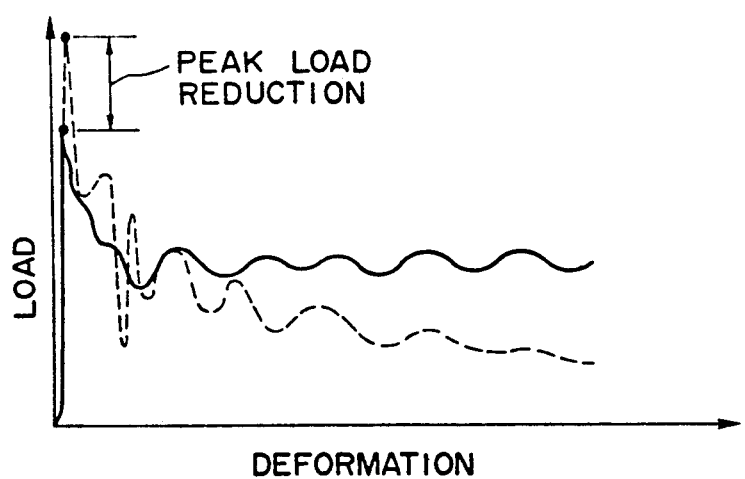

CONVEX    CONCAVE    CONVEX    CONCAVE

CAR BODY MEMBER WITH BEADS

BACKGROUND OF THE INVENTION

1. Field of the Invention

The present invention relates to a member having beads to be used to construct a car body.

2. Description of the Background Art

In an automobile, for the purpose of the protection of a passenger, members of a car body are equipped with concave or convex beads for absorbing an energy due to a crushing load exerted to them externally.

Such beads can be positioned in various different manners. For example, for a side member 103 inside an engine room 101 of a car 100 shown in FIGS. 1 and 2, beads 105 may be provided on edges as shown in FIG. 3(A), on side faces as shown in FIG. 3(B), or on both of these as shown in FIG. 3(C). In each of these cases, when the side member 103 is subjected to a crushing load in a direction A, the beads 105 function to prevent the side member 103 from bending or cracking, and to absorb an energy due to the crushing load by making the side member 103 to be crushed along the direction A.

Now, conventionally, the positions of such beads have been determined empirically, by an empirical formulae based on a size of a cross section of the member. (See, for example, "Occupant protection for frontal impact (Toyota) in Tenth ESV conference, 1986.)

However, the aforementioned empirical formulae determines the positions of the beads solely on a basis of the size of the cross section of the member, so that it is difficult to apply for a case in which a dynamical effect or a plasticity effect plays an important role. Also, this empirical formulae does not account for a case in which a member is attached to other member, so that it is almost always not applicable to a member having a complex shape.

SUMMARY OF THE INVENTION

It is therefore an object of the present invention to provide a car body member in which the concave and convex beads can be positioned appropriately regardless of a complexity of a shape of the member, and the efficiency of energy absorption can be improved.

According to one aspect of the present invention there is provided a car body member, including side faces having: concave beads provided on the side faces at positions corresponding to dip portions of a buckling waveform produced by an initial buckling load applied to the member in a state of having no bead; convex beads provided on the side faces at positions corresponding to peak portions of the buckling waveform; and flat portions without any bead, formed between each adjacent concave bead and convex bead.

According to another aspect of the present invention there is provided a method of positioning beads on side faces of a car body member, comprising the steps of: obtaining a buckling waveform produced by an initial buckling load applied to the member in a state of having no bead; positioning concave beads on the side faces at positions corresponding to dip portions of the buckling waveform; positioning convex beads on the side faces at positions corresponding to peak portions of the buckling waveform; and forming flat portions without any bead, between each adjacent concave bead and convex bead.

Other features and advantages of the present invention will become apparent from the following description taken in conjuction with the accompanying drawings.

BRIEF DESCRIPTION OF THE DRAWINGS

FIG. 6 is a table summarizing various properties of the concave bead, convex bead, and edge bead.

FIG. 7 is a graph of a load versus deformation for the side member with and without beads, showing an effect of the beads provided in accordance with the present invention.

FIGS. 10(A) and (B) are a perspective view and a side view, respectively, of a side member with edge beads provided.

FIG. 11 is a graph of a load versus deformation for the side member with and without beads, showing an effect of the edge beads provided in accordance with the present invention.

DETAILED DESCRIPTION OF THE PREFERRED EMBODIMENTS

Now, the preferred embodiment of the present invention will be described in detail.

According to the present invention, the concave and convex beads are positioned on a side face of a member to be subjected to a crushing load, at positions corresponding to peak portions and dip portions, respectively, of an initial buckling waveform produced by an initial buckling load, and flat portions are provided between the concave and convex beads.

The initial buckling waveform is a waveform appearing on the side face of the member when the member without any bead is crushed, due to the initial buckling load in a region immediately following the maximum load point.

With this configuration, the concave deformation and convex deformation of the side face are promoted by the concave beads and the convex beads, respectively, so as to induce the crushing in an axial direction from a top end, by which the energy released by the impact are absorbed. Here, because the concave and convex beads are positioned at the positions corresponding to peak portions and dip portions, respectively, of an initial buckling waveform produced by an initial buckling load, it is possible to account for the dynamical effect, plasticity effect, and the complex shape of the member, and therefore the amount of energy absorption can be increased. Moreover, the presence of the flat portions between the concave beads and the convex beads further increases the amount of energy absorption.

Figure 1:
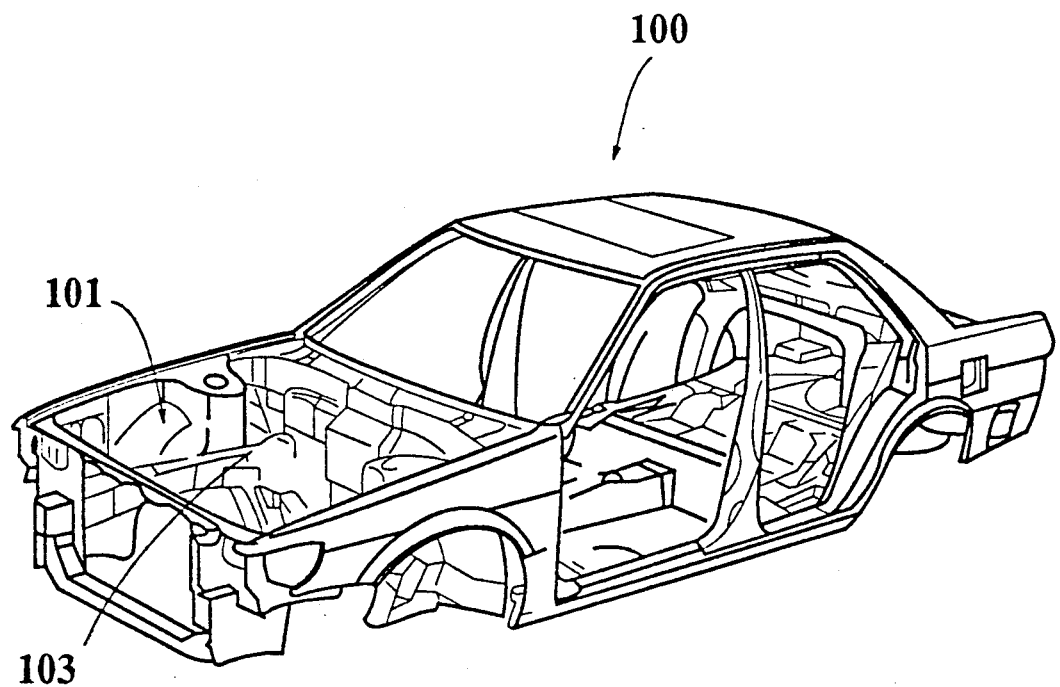
FIGS. 1 and 2 are illustrations of a car body and a side member in an engine room of the car body, to which beads are to be provided.
Figure 2:
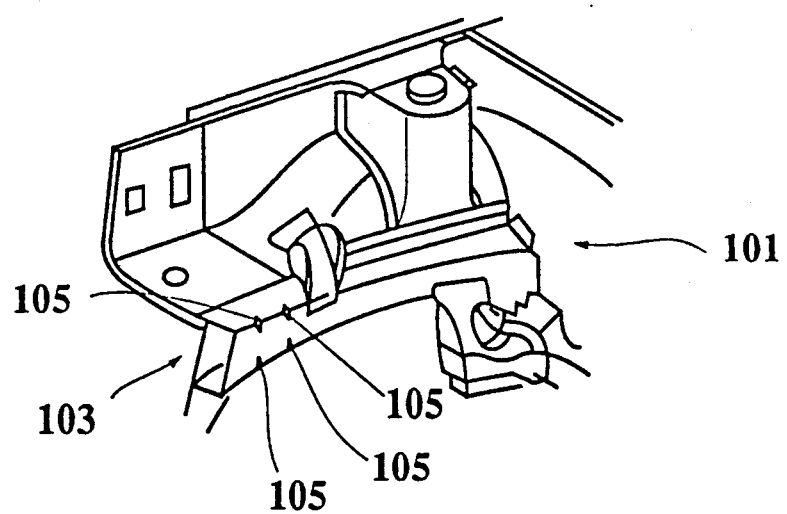
Figure 3:
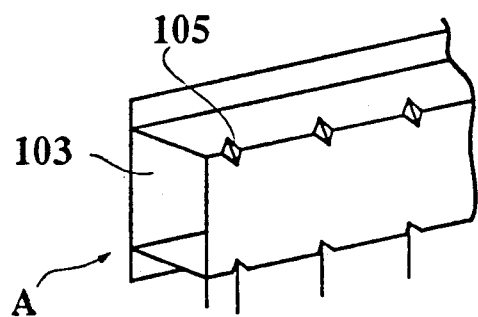
FIGS. 3(A), 3(B), and 3(C) are illustrations of three different types of beads.
Figure 3:
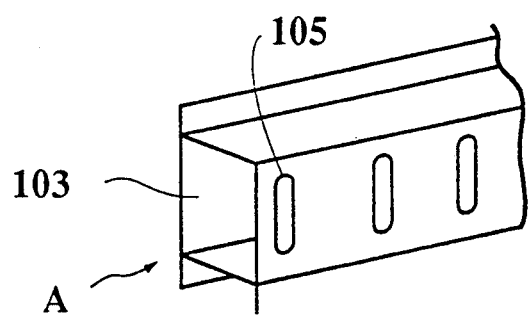
Figure 3:
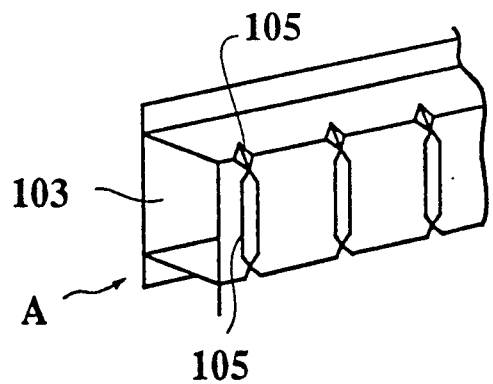
Figure 4A:
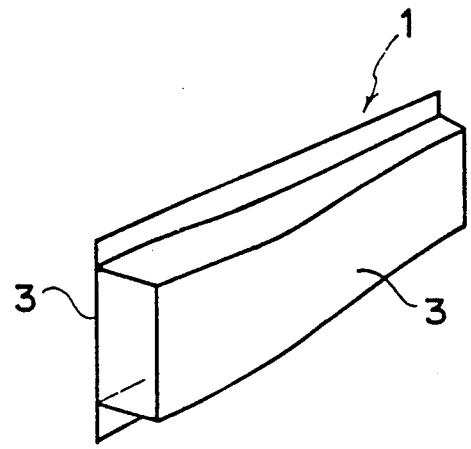
FIG. 4(A) is a perspective view of a side member to which the beads are to be provided in accordance with the present invention.
Figure 4B:
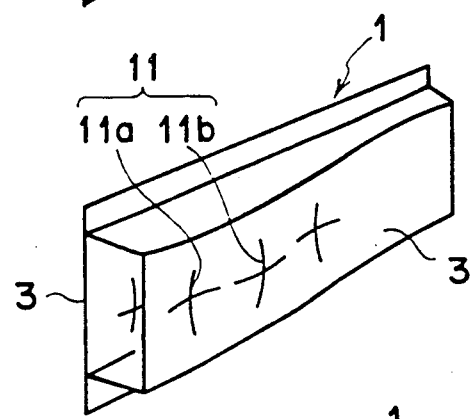
FIG. 4(B) is a perspective view of the side member of FIG. 4(A) with a buckling waveform produced on side faces.
Figure 4C:
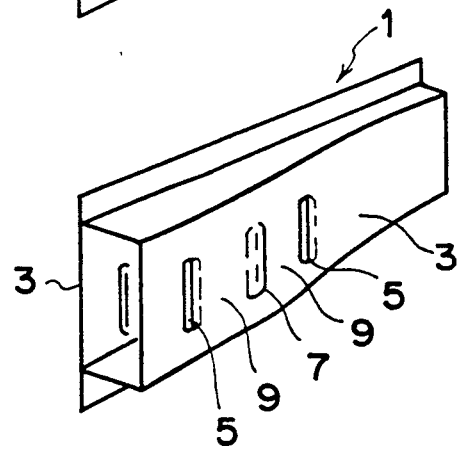
FIG. 4(C) is a perspective view of the side member of FIG. 4(A) with the beads provided in accordance with the present invention.

More specifically, for a side member shown in FIG. 4(A), beads are positioned on a side face 3 in accordance with the dip portions 11a and the peak portions 11b of the initial buckling waveform 11 produced by the initial buckling load shown in FIG. 4(B), so that the concave side face bead 5 and the convex side face bead 7 are positioned as shown in FIG. 4(C) at the positions corresponding to the dip portions 11a and the peak portions 11b of the initial buckling waveform 11, with the flat portion 9 formed therebetween.

Now, the various types of beads are known to have the following properties.

Figure 5A:
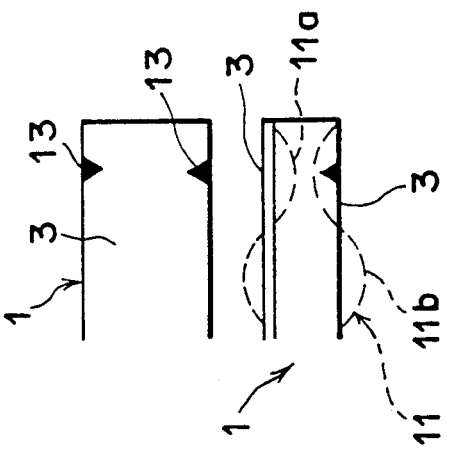
FIG. 5(A) is a developed view of a member with a concave bead provided, for explaining a property of the concave bead.

Namely, as shown in FIG. 5(A), a concave side face bead 5 on the side face 3 of the side member 1 has an effect to deform the side face 3 inward. In other words, the concave side face bead 5 promotes the concave deformation of the side face 3.

Figure 5B:
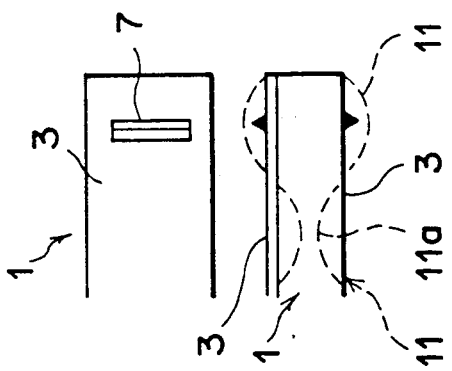
FIG. 5(B) is a developed view of a member with a convex bead provided, for explaining a property of the convex bead.

On the other hand, as shown in FIG. 5(B), a convex side face bead 7 on the side face 3 of the side member 1 has an effect to deform the side face 3 outward. In other words, the convex side face bead promotes the convex deformation of the side face 3.

Figure 5C:
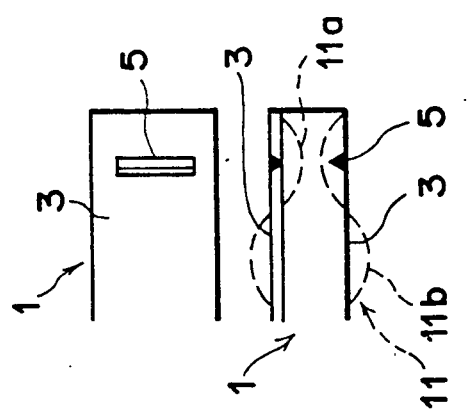
FIG. 5(C) is a developed view of a member with an edge bead provided, for explaining a property of the edge bead.

Also, as shown in FIG. 5(C), an edge bead 13 on a corner of the side face 3 of the side member 1 has an effect to deform the side face 3 inward, just as the concave side face bead 5. In other words, the edge bead 13 also promotes the concave deformation of the side face 3. The use of such an edge bead 13 will be described below in the next embodiment.

The properties of these three types of beads are summarized in a table of FIG. 6.

As indicated in FIG. 6, in addition to the effect of promoting various deformation described above, the concave bead 5 and the convex bead 11 have an effect to reduce a peak load by approximately 14% and they are effective in promoting the crushing, while the edge bead 13 has an effect to reduce the peak load by approximately 16% and it is effective in inducing the crushing.

Because of these properties of the beads, the beads on the side member 1 function as follows.

When a crushing load is exerted in an axial direction of the side member 1 from a front end by a collision or other cause, this crushing load is transmitted to the side member 1 through a front bumper (not shown) and a bumper stay (not shown).

When the buckling waveform 11 is produced on the side face 3 of the side member 1 by this crushing load, the concave and convex deformations of the side face 3 are promoted by the concave bead 5 and convex bead 7 placed at the positions of the dip portion 11a and the peak portion 11b, and as a result the side member 1 is crushed in an accordion like shape from the front end, by which a large part of a collision energy is absorbed.

Here, the flat portion 9 formed between the concave side face bead 5 and the convex side face bead 7 is less deformation than the portions where the concave side face bead 5 and the convex side face bead 7 are located, so that the deformation starts to take place from edges of these portions where the concave side face bead 5 and the convex side face bead 7 are located. Now, such edges are manufactured to have higher rigidity, so that larger amounts of energy can be absorbed by the deformation of these edges. In this process, the fact that the positions of the concave side face bead 5 and the convex side face bead 7 are in conformity with the buckling waveform helps the side member 1 to deform from the edges rather than cracking.

The effect of the concave side face bead 5 and the convex side face bead 7 can be seen in a graph of load versus deformation shown in FIG. 7, which indicates that an amount of energy absorption is larger for an axial crushing mode occurring with the beads than for a cracking mode occurring without any bead.

Figure 8A:
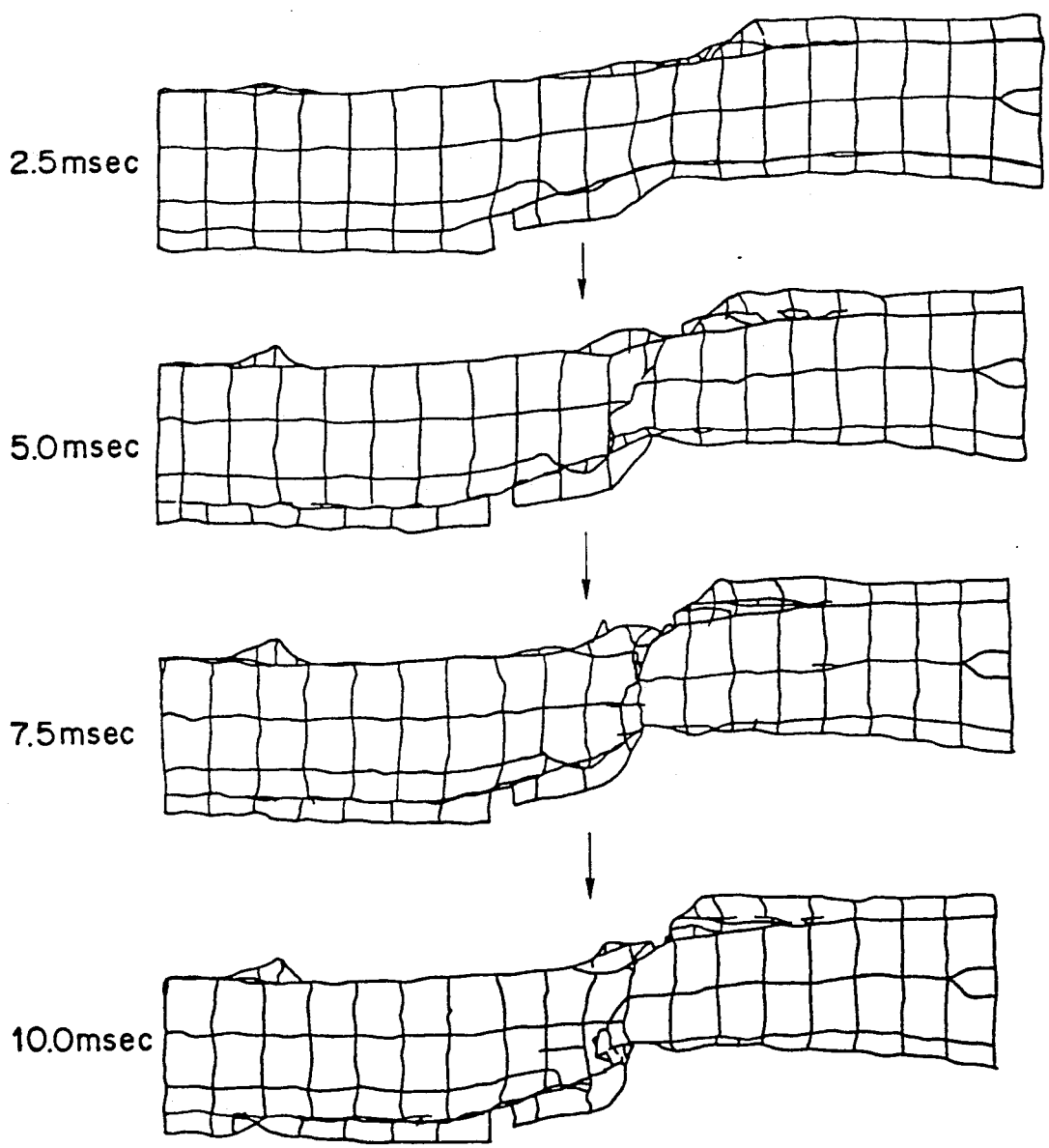
FIGS. 8(A) and (B) are sequential side view and top plan view, respectively, of a crushing mode of the side member without beads.
Figure 8B:
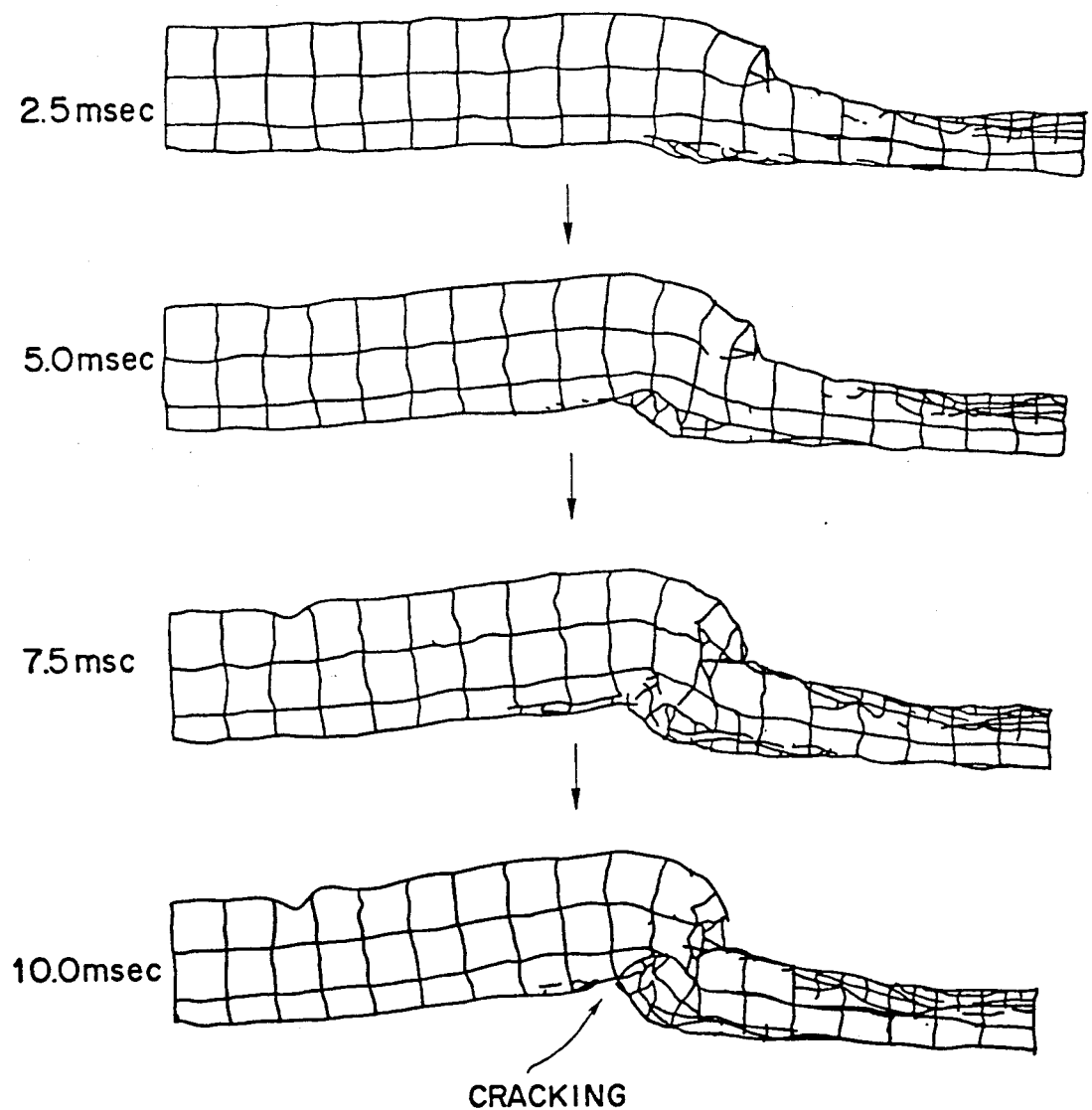
Figure 9A:
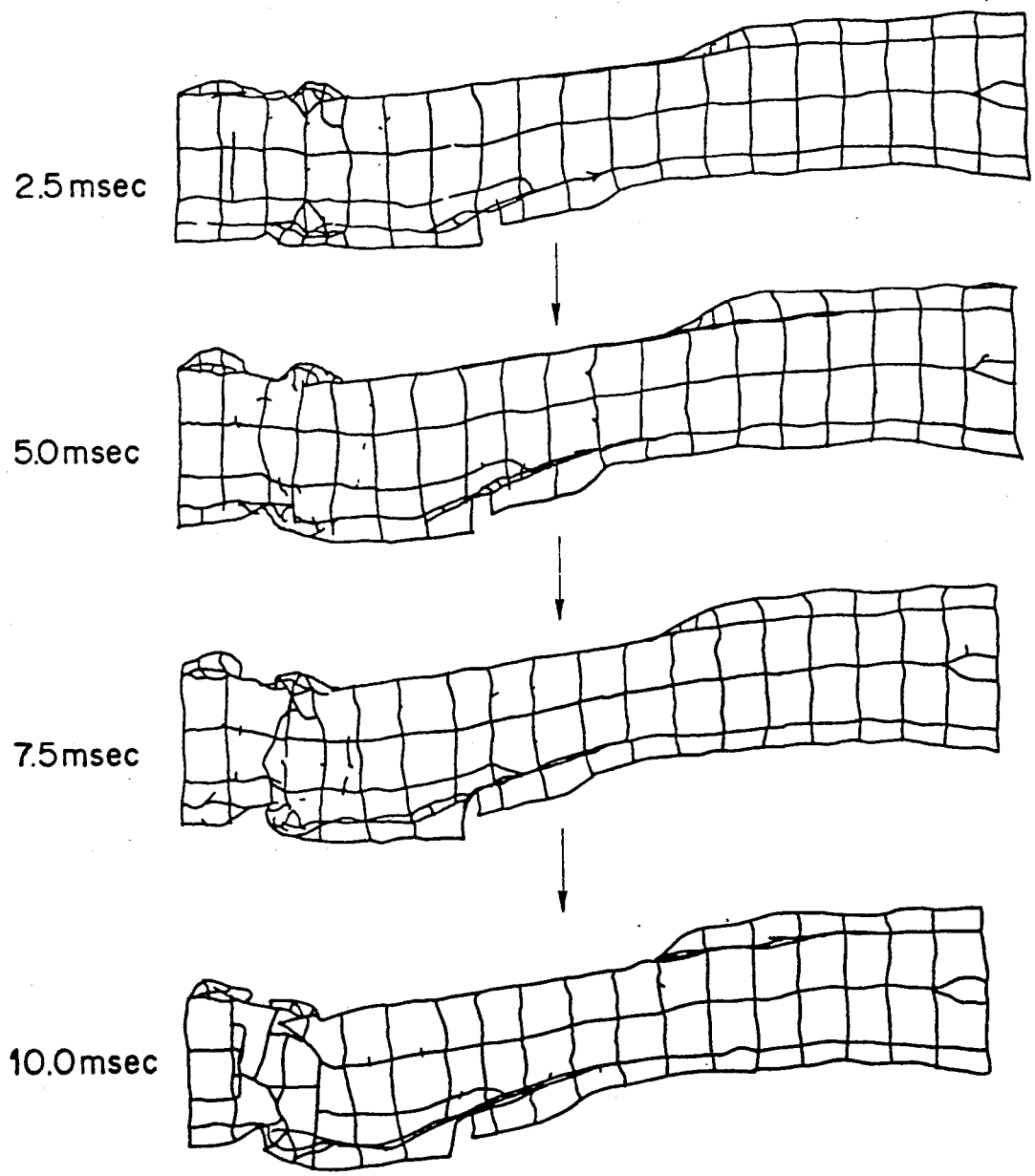
FIGS. 9(A) and (B) are sequential side view and top plan view, respectively, of a crushing mode of the side member with beads.

Also, the effect of providing the concave side face bead 5 and the convex side face bead 7 is demonstrated in experimental data shown in FIGS. 8(A) and (B) and FIGS. 9(A) and (B). These data shows an experimentally obtained crushing mode for a member or 60 cm length, 10 cm width and 15 cm height at 2.5 msec, 5.0 msec, 7.5 msec, and 10.0 msec after a collision, where FIGS. 8(A) and (B) are a side view and a top plan view obtained by the member without any bead, whereas FIGS. 9(A) and (B) are a side view and a top plan view obtined by the member with alternately arranged concave side face beads 5 and convex side face beads 7 placed at 5 cm intervals. As shown in FIGS. 8(A) and (B), without any bead, a cracking is produced on the member, whereas as shown in FIG. 9(A) and (B), with the beads, an axial crushing is produced on the member.

Next, an embodiment showing a use of the edge beads 13 mentioned above will be described.

Namely, as shown in FIGS. 10(A) and (B), the edge beads 13 are positioned in this embodiment at positions corresponding to a dip portion 11a of the buckling waveform 11 which is closest to the front end of the side member 1. In this case, the concave side face bead 5 is omitted from this position where the edge beads 13 are positioned.

As already mentioned above, the edge beads 13 have an effect to promote the concave deformation, and are effective in inducing the crushing,, so that by placing the edge beads 13 near the front end of the member 1, the crushing can be caused more easily. This is due to the fact that, the edge beads 13 also have the effect to reduce the peak load more than the concave or convex beads. Thus, as shown in a graph of FIG. 11, more effective peak load reduction can be achieved by using the edge beads 13. This reduction of the peak load is turn reduces the possibility for the occurrence of a cracking.

Figure 12:
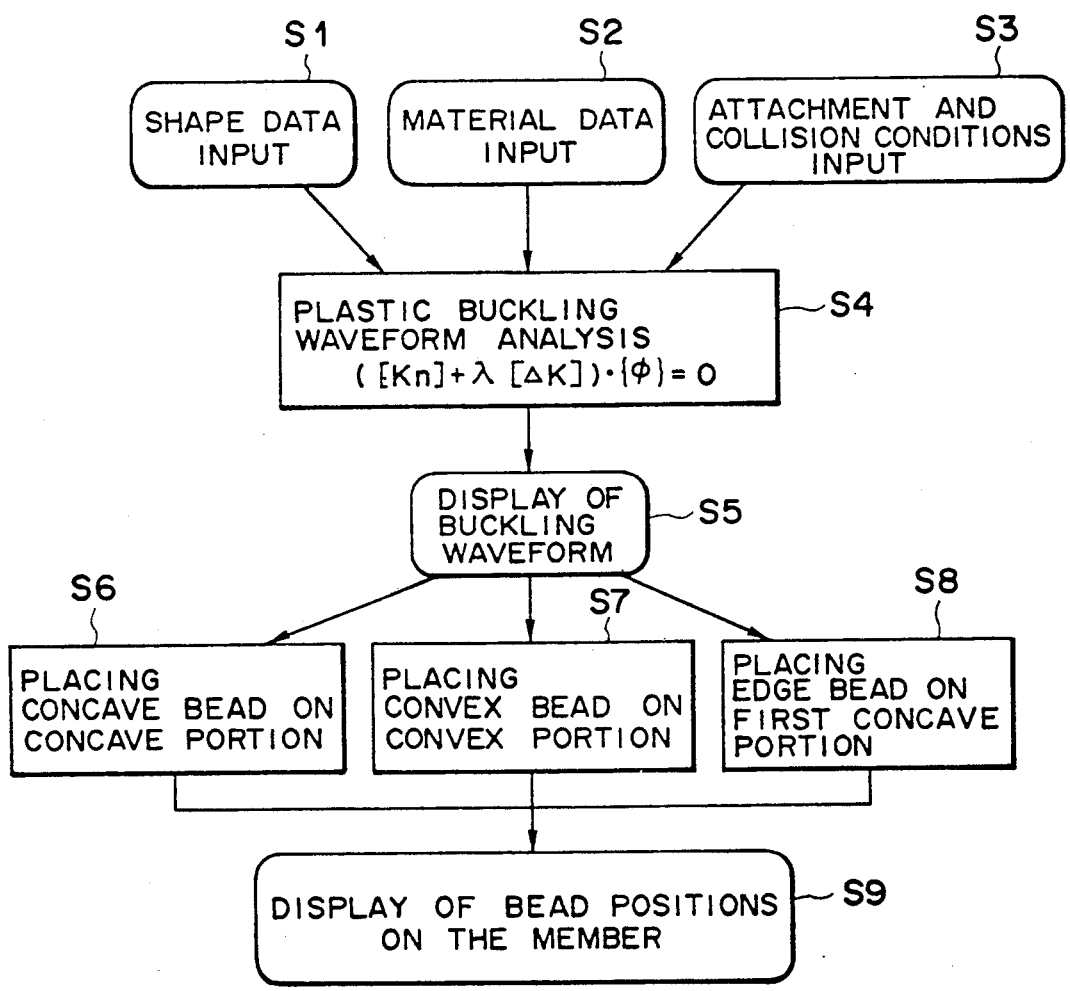
FIG. 12 is a flow chart for a process of determining the positions of the beads according to the present invention.

The determination of the positions of the beads in the embodiments described above can be achieved by a computer operation according to the flow chart of FIG. 12.

First, at the step S1, the side member 1 without any bead, which is divided into a finite number of parts, is entered in terms of coordinates of each part. By this input, shape data concerning the shape of the side member 1, such as a length and a thickness, are obtained. Thus, even when the side member 1 has a complex shape, the shape of the side member 1 can be taken into account.

Next, at the step S2, material data concerning the physical property of the material making up the side member 1, such as Young's modulus and Poisson ratio, are entered. By this input of the material data, the plasticity effect on the crushing is taken into account.

Next, at the step S3, data on attachment conditions concerning rigidity of attachment of the side member 1 to a car body, and collision conditions such as a collision speed and direction are entered. By these data, the attachment of the member as well as the dynamical effect can be taken into account.

Next, at the step S4, a so called plastic buckling waveform analysis is performed by using various data entered at the steps S1 and S3. This plastic buckling waveform analysis is performed according to the following equation (1).

$$([K_n] - \lambda[\Delta K]) \cdot \{\phi\} = 0 \qquad (1)$$

where $[K_n]$ is a tangent line rigidity at an n-th step, $[\Delta K] = [K_n] - [K_{n-1}]$, $\lambda$ is a characteristic value (degree of buckling mode), and $\{\phi\}$ is a characteristic vector (mode waveform). Thus, $[K_n]$ and $[K_{n-1}]$ are obtained from the data entered at the steps S1 to S3, from which $[\Delta K]$ is calculated, and from the obtained $[K_n]$ and $[\Delta K]$, $\lambda$ and $\{\phi\}$ are derived from the equation (1), which determines the simulated buckling waveform.

Figure 13:
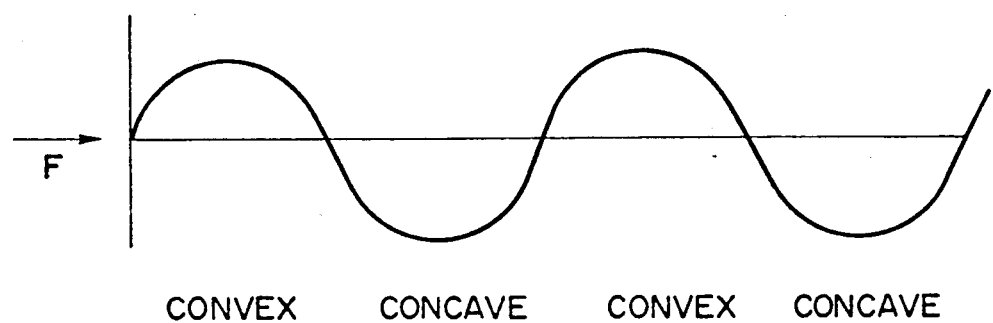
FIG. 13 is an illustration of a display of a buckling waveform utilized in the process of FIG. 12.

When the simulated buckling waveform is obtained, next at the step S5, the obtained buckling waveform is displayed as shown in FIG. 13.

Then, as the steps S6, S7 and S8, the positions of the concave side face beads 5, convex side face beads 7, and edge beads 13, respectively, are determined on the displayed buckling waveform.

Finally, at the step S9, the positions of these beads on the side member 1 is displayed.

As described, according to the present invention, it is possible to improve the efficiency of energy absorption, regardless of the complexity of the shape of the member, by controlling the crushing mode with the concave and convex beads which promote the concave and convex deformations of the side face. In addition, because of the flat portion formed between the concave and convex beads, the cracking is effectively prevented, so that the axial crushing which is effective in energy absorption is produced easily.

Figure 14:
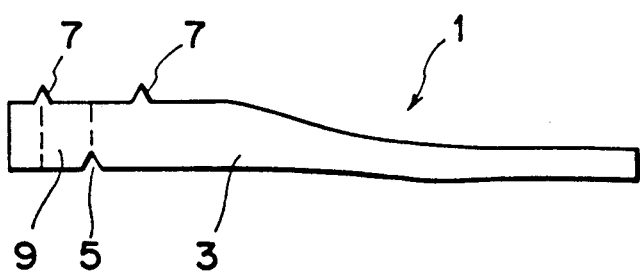
FIG. 14 is a side view of a side member showing one variation for the arrangement of the beads according to the present invention.

It is to be noted that, as shown in FIG. 14, the concave beads 5 and the convex beads 7 may be arranged on opposing side faces alternately, with the flat portion 9 formed therebetween, instead of the arrangement of the embodiments described above. In this arrangement, the similar effect can be achieved with a reduced number of beads on the side member 1.

It is also to be noted that the present invention as described above is equally applicable to a rear side member of a car body.

What is claimed is:

1. A car body member, including side faces having:
   concave beads provided on the side faces at positions corresponding to dip portions of a buckling waveform, said bucking waveform being produced by a simulated initial buckling load applied to the member in a state in which the member has no beads;
   convex beads provided on the side faces at positions corresponding to peak portions of the buckling waveform; and
   flat portions without any bead, formed between each adjacent concave bead and convex bead.

2. The member of claim 1, further including edge beads provided on edges of the side faces at positions corresponding to a dip portion of the buckling waveform which is closest to a front end to be subjected to a crushing load.

3. The member of claim 1, wherein the buckling waveform is a waveform which is obtained by a plastic buckling waveform analysis.

4. The member of claim 3, wherein the plastic buckling waveform analysis uses data indicative of a shape of the member.

5. The member of claim 3, wherein the plastic buckling waveform analysis uses data indicative of physical properties of a material of the member.

6. The member of claim 3, wherein the plastic buckling waveform analysis uses data on conditions of a collision which gives rise to a crushing load to be applied to the member.

7. The member of claim 3, wherein the plastic buckling waveform analysis uses data indicative of conditions of a attachment of the member to another member of the car body.

8. A method of positioning beads on side faces of a car body member, comprising the steps of:
   obtaining a buckling wave form produced by a simulated initial buckling load applied to the member in a state in which the member has no bead;
   positioning concave beads on the side faces at positions corresponding to dip portions of the buckling waveform;
   positioning convex beads on the side faces at positions corresponding to peak portions of the buckling waveform; and
   forming flat portions without any bead, between each adjacent concave bead and convex bead.

9. The method of claim 8, further comprising the step of positioning edge beads on edges of the side faces of positions corresponding to a dip portion of the buckling waveform which is closest to a front end to be subjected to a crushing load.

10. The method of claim 8, wherein the step of obtaining a buckling waveform is obtained by performing a plastic buckling waveform analysis.

11. The method of claim 10, wherein the step of obtaining a plastic buckling waveform analysis uses data indicative of a shape of the member.

12. The method of claim 10, wherein the step of performing a plastic buckling waveform analysis uses data indicative of physical properties of a material of the member.

13. The method of claim 10, wherein the step of performing a plastic buckling waveform analysis uses data indicative of conditions of a collision which gives rise to the crushing load.

14. The method of claim 10, wherein the step of performing a plastic buckling waveform analysis uses data indicative of conditions of an attachment of the member to another member of the car body.

15. A method of forming beads on a side face of member of a car body comprising the steps of:

(A) simulating a crushing load applied to an end of said member which is sufficient to cause an initial buckling of said member; then (B) obtaining a buckling waveform produced by the simulated load, said waveform having a plurality of peak portions and dip portions;

(C) forming concave beads on said side face at positions corresponding to said dip portions;

(D) forming convex beads on said side face at positions corresponding to said peak portions; and (E) forming flat portions without any bead between each adjacent concave bead and convex bead.

16. The method as recited in claim 15, further comprising the step of providing an edge bead on an edge of said side face at a position corresponding to the one of said dip portions which is closest to an end of said member to be subjected to said crushing load.

* * * * *